(12) United States Patent
Iacono

(10) Patent No.: US 7,395,305 B2
(45) Date of Patent: Jul. 1, 2008

(54) METHOD AND RELATIVE CIRCUIT FOR INCREMENTING, DECREMENTING OR TWO'S COMPLEMENTING A BIT STRING

(75) Inventor: Daniele Lo Iacono, Reggio Calabria (IT)

(73) Assignee: STMicroelectronics S.r.l., Agrate Brianza (IT)

(*) Notice: Subject to any disclaimer, the term of this patent is extended or adjusted under 35 U.S.C. 154(b) by 687 days.

(21) Appl. No.: 10/651,075

(22) Filed: Aug. 28, 2003

(65) Prior Publication Data
US 2004/0073586 A1    Apr. 15, 2004

(30) Foreign Application Priority Data
Aug. 30, 2002   (EP)   ................... 02425538

(51) Int. Cl.
*G06F 7/50* (2006.01)
(52) U.S. Cl. .................................... 708/672
(58) Field of Classification Search ................. 708/672
See application file for complete search history.

(56) References Cited

U.S. PATENT DOCUMENTS

| | | | | |
|---|---|---|---|---|
| 3,532,866 | A | * | 10/1970 | Cliff ............................ 708/672 |
| 3,989,940 | A | * | 11/1976 | Kihara ......................... 708/672 |
| 4,153,939 | A | * | 5/1979 | Kudou .......................... 708/672 |
| 4,218,750 | A | * | 8/1980 | Carter et al. .................. 708/672 |
| 4,417,316 | A | * | 11/1983 | Best ............................. 708/672 |
| 4,486,851 | A | * | 12/1984 | Christopher et al. ......... 708/672 |
| 4,534,010 | A | | 8/1985 | Kobayashi et al. .......... 364/748 |
| 4,953,115 | A | * | 8/1990 | Kanoh ......................... 708/201 |
| 5,146,479 | A | | 9/1992 | Okada et al. .................. 377/41 |
| 5,333,120 | A | | 7/1994 | Gilber't ........................ 364/786 |

OTHER PUBLICATIONS

Hashemian et al., A New Parallel Technique for Design of Decrement/Increment and Two's Complement Circuits, Proceedings of the Midwest Symposium on Circuits and Systems, Monterey, May 14-17, 1991, New York, US, vol. 2 Symp. 34, May 14, 1991, pp. 887-890, XP000333546.

Sone et al., A 10-b 100-Msample/s Pipelined Subranging BiCMOS ADC, IEEE Journal of Solid-State Circuits, IEEE Inc. New York, US, vol. 28, No. 12, Dec. 1, 1993, pp. 1180-1186, XP000435890.

Stan et al., Synchronous Up/Down Counter with Clock Period Independent of Counter Size, Proceedings 13th IEEE Symposium on Computer Arithmetic, CA, Jul. 6-9, 1997, pp. 274-281, XP00788135.

Parhami, Computer Arithmetic Algorithms and Hardware Designs, 2000, Oxford University Press, New York, XP002245799, Sections 5.2 and 5.5, pp. 78-80, 83-85.

* cited by examiner

*Primary Examiner*—Tan V. Mai
(74) *Attorney, Agent, or Firm*—Lisa K. Jorgenson; Allen, Dyer, Doppelt, Milbrath & Gilchrist, P.A.

(57) ABSTRACT

A method for incrementing, decrementing or two's complementing a first string of bits includes generating an auxiliary string of bits as a function of the first string, and logically combining the auxiliary string with the first string to generate a corresponding output string. A least significant bit of the auxiliary string is independent from the bits of the first string, and any other bit of the auxiliary string. The method is particularly convenient for generating an overflow flag when the number to be output exceeds the representation interval. An overflow flag is generated by logically combining the most significant bits of the first and auxiliary strings.

36 Claims, 12 Drawing Sheets

METHOD AND RELATIVE CIRCUIT FOR INCREMENTING, DECREMENTING OR TWO'S COMPLEMENTING A BIT STRING

FIELD OF THE INVENTION

The present invention relates to complementation devices used in microprocessors, and in particular, to a method and an associated circuit for incrementing, decrementing or two's complementing a bit string.

BACKGROUND OF THE INVENTION

Generally, a microprocessor includes an Arithmetic and Logic Unit (ALU) for performing the four arithmetic operations. In the ALU, every integer number X is represented in the form of a bit string using the so-called two's complement coding. Indicating with $X_k$ a generic bit of a string of N bits representing the number $X \in [-2^{N-1}, 2^{N-1}-1]$, the integer number X is given by $$X = \sum_{k=0}^{N-2} X_k \cdot 2^k - X_{N-1} \cdot 2^{N-1} \quad (1)$$

This coding is very convenient because it allows the difference operation to be performed as a sum of relative numbers using a common adder.

The two's complement of a bit string X may be easily obtained by logic circuits. In fact, indicating with $\overline{X}$ the one's complement of X is given by $$\overline{X} = 2^N - 1 - X \quad (2)$$

which is obtained by inverting each bit of the string X. The string $Y_{TC}(X)$ representing the two's complement of X is simply obtained adding 1 to the one's complement of X is given by $$Y_{TC}(X) = \overline{X} + 1 = 2^N - X \quad (3)$$

A two's complement circuit is depicted in FIG. 1. The two's complement circuit of the ALU may be used for performing increment or decrement operations. The circuit of FIG. 2 increments by one the string X because the string X+1 is the two's complement of the one's complement of the string X is given by $$X + 1 = \overline{\overline{X}} + 1 = \overline{(\overline{X})} + 1 = Y_{TC}(\overline{X}) \quad (4)$$

Similarly, it is possible to demonstrate that the circuit of FIG. 3 decrements by one the string X, because the string X−1 is the one's complement of the two's complement of the string X is given by $$X - 1 = 2^N - 2^N + X - 1 = 2^N - 1 - (2^N - X) = 2^N - 1 - Y_{TC}(X) = \overline{Y_{TC}(X)} \quad (5)$$

The fact that these increment and decrement operations can be performed by a two's complement circuit has lead to the realization of the so-called DIT (Decrement, Increment, Two's complement) circuits, such as the one depicted in FIG. 4. This circuit is substantially formed by a logic selection circuit SEL generating logic signals INV_IN and INV_OUT, by an array of input XOR gates input with the bits of the string X and the signal INV_IN, and by an array of XOR output gates receiving the bits of the two's complement string and the signal INV_OUT. The circuit of FIG. 4 performs a decrement, increment or two's complement operation, with the logic state of the commands ID and TC being determined according to the following table

TABLE 1

| ID | TC | OPERATION | INV_IN | INV_OUT |
|----|----|-----------|--------|---------|
| 0  | 0  | Decrement | 0      | 1       |
| 1  | 0  | Increment | 1      | 0       |
| —  | 1  | two's     | 0      | 0       |

Because of the importance of the DIT circuit, the architecture thereof has been studied to find two's complement circuits that imply the smallest possible number of required elementary operations and that occupy the smallest possible silicon area. In the articles by R. Hashemian "Highly Parallel Increment/Decrement Using CMOS Technology", Proceedings of the 33rd Midwest Symposium on Circuits and Systems, Calgari, Alberta, Canada, Aug. 12-14, 1990 and by R. Hashemian and C. Chen "A New Parallel Technique For Design of Decrement/Increment and Two's Complement Circuits", Proceedings of the 34th Midwest Symposium on Circuits and Systems, Monteray, Calif., May 14-17, 1991 techniques for forming decrement, increment and two's complement circuits are described, that offer certain advantages both in terms of silicon area consumption as well as in terms of speed.

By applying eq. 3, it is possible to note that the two's complement of the number $-2^{N-1}$ is the number $-2^{N-1}$ itself. This fact is due to the asymmetry of the interval $X \in [-2^{N-1}, 2^{N-1}-1]$, thus the two's complement of $-2^{N-1}$ exceeds the representation interval.

In many applications the two's complement of $-2^{N-1}$ is represented with the positive integer $2^{N-1}-1$ $$Y_{TC}(-2^{N-1}) = 2^{N-1} - 1 = \overline{X} \quad (6)$$

generating at the same time an overflow flag OF signaling that the representation interval has been exceeded.

A known two's complement circuit with overflow check is depicted in FIG. 5. It generates an overflow flag OF when the string to be complemented represents the number $-2^{N-1}$, and has a correction circuit CLIP that receives a two's complement string Z and the overflow flag OF, generating the correct output string Y.

The overflow check circuit OVERFLOW CHECK is input with the string X and with a string REF representing the number $-2^{N-1}$, and activates the flag OF when the two strings coincide. The correction circuit CLIP generates an output string Y equal to the two's complement string Z when the flag OF is not active, while it produces the string 011 . . . 1 representing the number $2^{N-1}-1$ when the flag OF is active. Unfortunately, the known two's complement circuit depicted in FIG. 5 is not convenient because the circuit OVERFLOW CHECK is an N bit comparator, whose silicon area occupation depends on the number of bits of the string X.

SUMMARY OF THE INVENTION

In view of the foregoing background, an object of the present invention is to provide a method and an associated circuit for incrementing, decrementing or two's complementing an N bit string X in a straightforward manner.

To perform these operations, the method of the invention generates an auxiliary string M of N bits as a function of the string X, and combines it logically with the string X to generate a corresponding output string Y. The least significant bit of the auxiliary string is independent from the bits of the string X, and any other bit $M_L$ of the auxiliary string.

The operation of generating the auxiliary string M for performing the operations of increment, decrement and two's complement is particularly convenient for generating an overflow flag when the number to be output exceeds the representation interval. In fact, according to the method of the invention, an overflow flag OF is generated simply by combining logically the most significant bits $M_{N-1}$ and $X_{N-1}$ of the strings M and X. This is a great advantage because the overflow flag is generated by a single logic gate input with the bits $M_{N-1}$ and $X_{N-1}$, independently from the number of bits N of the string X, while in known two's complement circuits it is generated by an N bit comparator that occupies a silicon area that is non-negligible and depends on the length of the string X.

Obviously, depending on the fact that an increment, decrement or two's complement operation is to be performed, the strings X and M are combined according to different logic operations for generating the output string Y.

The method of the invention is implemented by a circuit for incrementing, decrementing or two's complementing a string formed by a number of N bits. The circuit comprises an auxiliary circuit generating an auxiliary string of N bits as a function of the first string. The least significant bit of the auxiliary string is independent from the first string and any other bit of the auxiliary string. The method starts from the second least significant bit up to the most significant bit, and performs a logic combination of a corresponding bit of the first string or of a negated replica thereof, starting from the least significant bit up to the second most significant bit, and of the bits of the first string or of the negated replica thereof less significant than the corresponding bit. Logic circuit means generate an output string as a logic combination of the auxiliary string and of the first string.

BRIEF DESCRIPTION OF THE DRAWINGS

The different aspects and advantages of the present invention will appear even more evident through a detailed description of embodiments referring to the attached drawings, wherein:

FIG. 7a is a detailed view of the auxiliary circuit depicted in FIG. 6a;

FIG. 8a is a detailed view of a second embodiment of the auxiliary circuit depicted in FIG. 6a;

FIG. 8b is a detailed view of a third embodiment of the auxiliary circuit of FIG. 6a;

FIG. 9a depicts a decrement circuit of the invention using the two's complement circuit of FIG. 6a;

FIGS. 9b and 9c depict alternative embodiments of the decrement circuit of FIG. 9a;

FIG. 10a depicts an increment circuit of the invention that uses the two's complement circuit of FIG. 6a;

FIGS. 10b and 10c depict alternative embodiments of the increment circuit of FIG. 10a;

FIG. 11a depicts an increment/decrement circuit of the invention that uses the circuit of FIG. 6a;

FIGS. 11b, 11c and 11d depict alternative embodiments of the increment/decrement circuit of FIG. 11a;

FIG. 12a depicts a multifunction DIT circuit of the invention that uses the circuit of FIG. 6a;

FIGS. 12b and 12c depict alternative embodiments of the multifunction DIT circuit of FIG. 12a;

FIG. 13 depicts a two's complement circuit of the invention with overflow test that uses the two's complement circuit of FIG. 6a;

FIG. 15 depicts a multifunction DIT circuit of the invention with overflow check that uses the two's complement circuit of FIG. 6a;

DETAILED DESCRIPTION OF THE PREFERRED EMBODIMENTS

Figure 6A:
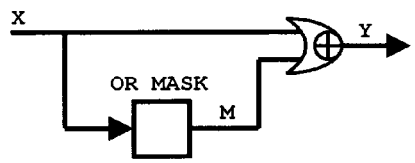
FIG. 6a depicts a two's complement circuit of the invention having an auxiliary circuit OR MASK.
Figure 6B:
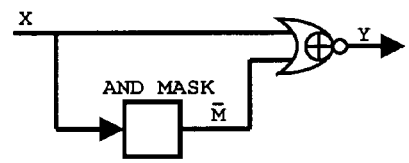
FIG. 6b depicts a two's complement circuit of the invention having an auxiliary circuit AND MASK.

Two equivalent embodiments of two's complement circuits implementing the method of the invention are depicted in FIGS. 6a and 6b. They have an auxiliary circuit OR MASK and AND MASK, respectively, input with the N−1 least significant bits of the string X and generating a corresponding auxiliary string M and $\overline{M}$ of N bits.

It is worth noting that the auxiliary string $\overline{M}$ generated by the circuit AND MASK is a negated version of the string M generated by the circuit OR MASK. The two circuits of FIGS. 6a and 6b are thus nearly equivalent.

According to the method of the invention, with $X_{L-1}$ being the least significant bit X of the string X equal to 1, the least significant bits of the auxiliary string from the second $M_1$ to the (L+1)-th $M_L$ generated by the circuit of FIG. 6a (or 6b) coincide with the L least significant bits of the string X (or with their negated replicas), while the remaining bits are all equal to 1 (or to 0), while the least significant bit of the auxiliary string M is independent from the string X and is 0 (or 1).

The circuit of FIG. 6a effectively performs the two's complement of the string X. From simple calculations one finds that the two's complement (eq. 3) of the string X is the logic XOR between the string X and the string M $$Y_{TC}(X) = X \oplus M \quad (7)$$

Figure 7A:
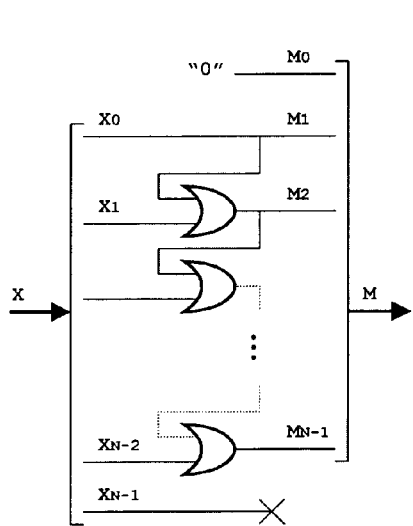

An auxiliary circuit OR MASK that is easy to form is shown in FIG. 7a. It is substantially composed of an array of OR gates in cascade, with each gate being input with a bit of the string X and with the output of the OR gate that precedes in the cascade.

Figure 7B:
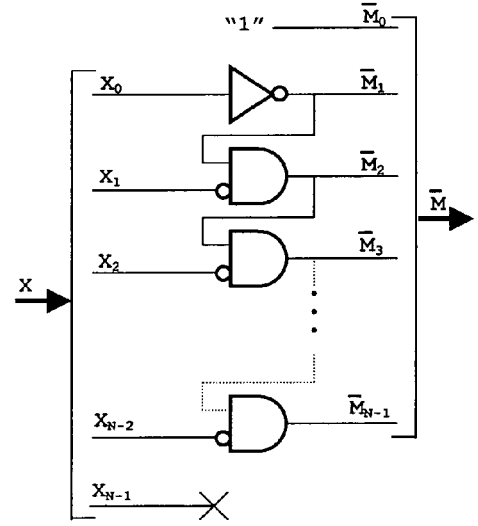
FIG. 7b is a detailed view of the auxiliary circuit depicted in FIG. 6b.

An auxiliary circuit AND MASK for the two's complement circuit of FIG. 6b is depicted in FIG. 7b. It is substantially similar to the circuit of FIG. 7a but it has AND gates instead of OR gates and generates an auxiliary string $\overline{M}$ which is the negated replica of the auxiliary string M generated by the circuit of FIG. 7a.

As will be evident to those skilled in the art, it is possible to form the circuits of FIGS. 7a and 7b even using NOR and NAND gates instead of OR and AND gates.

Figure 8A:
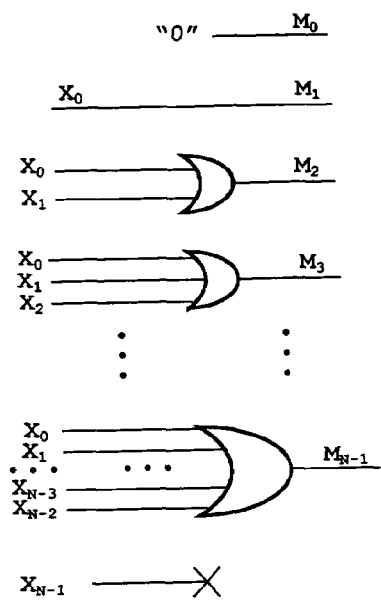
Figure 8B:
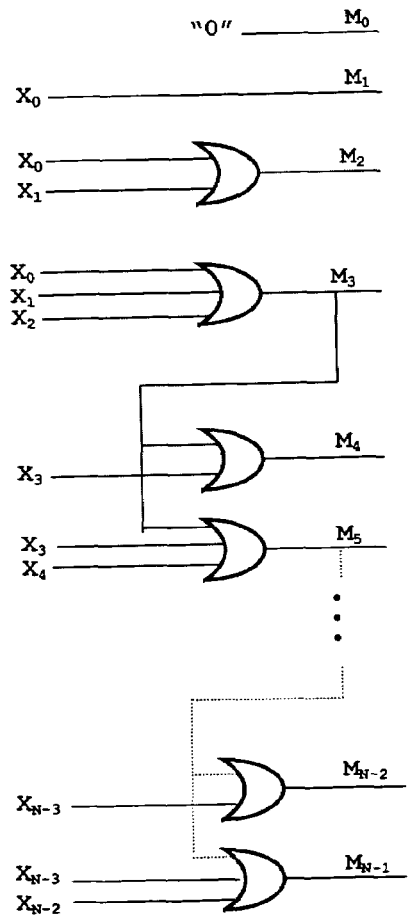

The auxiliary circuit OR MASK (AND MASK) is substantially a circuit that generates a string M whose L least significant bits are equal to 0(1) and all the remaining bits are equal to 1 (0), with $X_{L-1}$ being the least significant bit equal to 1 of the string X. Therefore, it is evident that the auxiliary circuit of FIG. 7a (7b) may be substituted by any other circuit that carries out the same operation. For example, it is possible to substitute the circuit of FIG. 7a, which has OR gates in series, with auxiliary circuits OR MASK of FIGS. 8a and 8b, that have OR gates disposed in parallel and in a hybrid series-parallel structure, respectively. Alternative structures, similar to those of FIGS. 8a and 8b, may also be simply realized for the auxiliary circuit AND MASK of FIG. 7b.

For better illustrating the invention, in the ensuing description reference will be made to the embodiment of FIG. 6a with the auxiliary circuit OR MASK of FIG. 7a, but what will be stated can be easily repeated even for the embodiment of FIG. 6b and for all other embodiments of the auxiliary circuit.

Figure 9A:
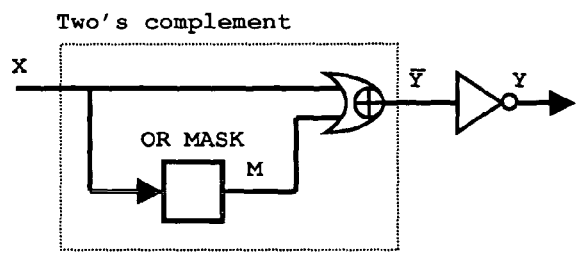
Figure 9B:
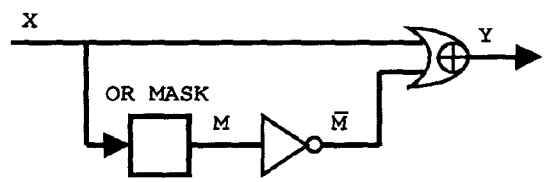
Figure 9C:
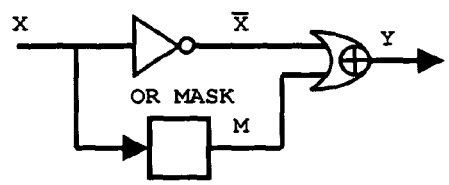
Figure 10A:
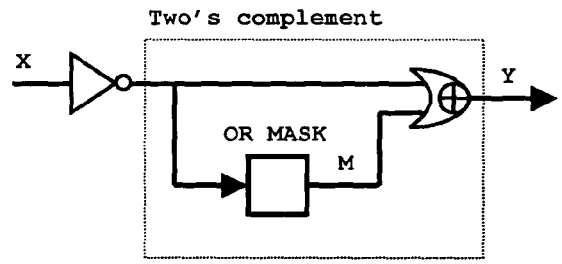
Figure 10B:
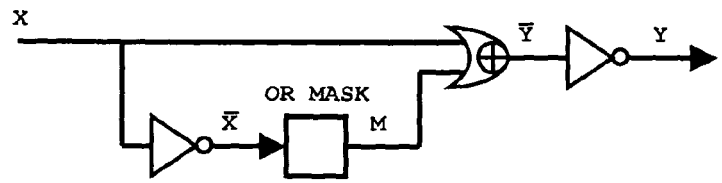
Figure 10C:
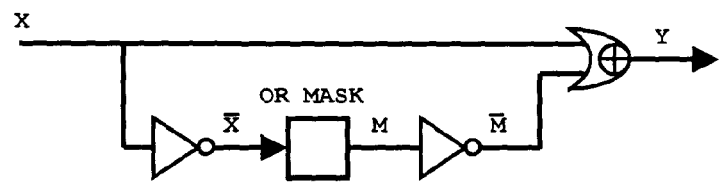
Figure 11A:
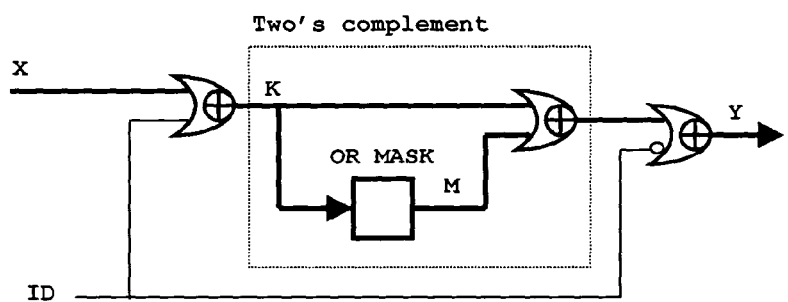
Figure 11B:
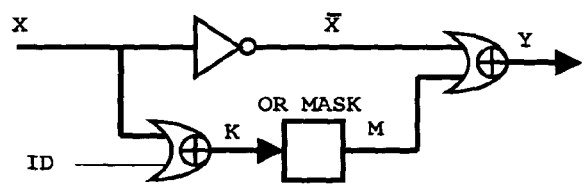
Figure 11C:
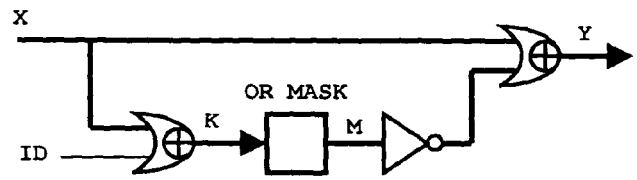
Figure 11D:
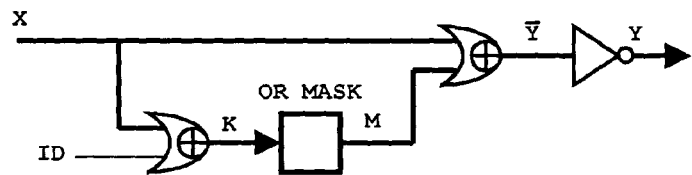
Figure 12A:
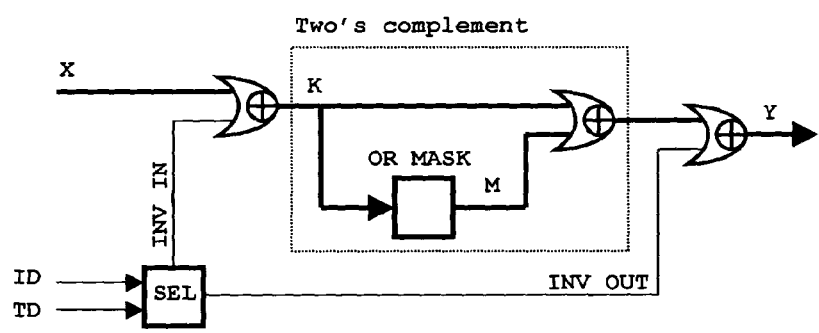
Figure 12B:
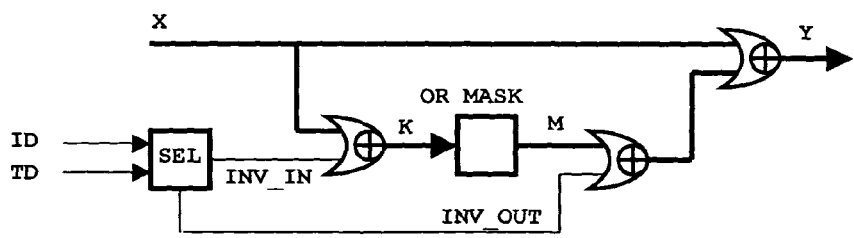
Figure 12C:
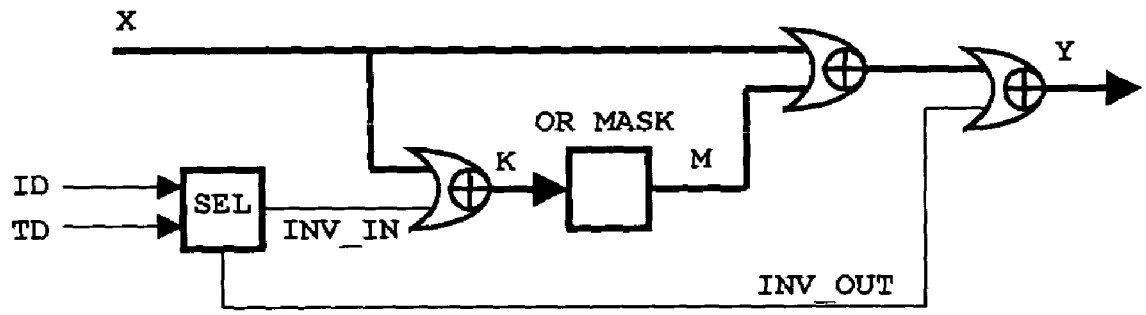

The two's complement circuit of the invention may be used for forming a circuit for decrementing, depicted in FIG. 9a, a circuit for incrementing, depicted in FIG. 10a, an increment/decrement circuit depicted in FIG. 11a, or finally a multifunction DIT circuit, depicted in FIG. 12a. Alternative embodiments of decrement, increment, increment/decrement and multifunction DIT circuits equivalent to those of FIGS. 9a, 10a, 11a and 12a are depicted in FIGS. 9b and 9c, in FIGS. 10b and 10c, in FIGS. from 11b to 11d and in FIGS. 12b and 12c, respectively.

Figure 1:
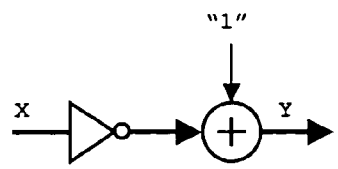
FIG. 1 depicts a two's complement circuit of a string according to the prior art.
Figure 2:
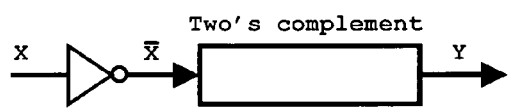
FIG. 2 depicts an increment circuit of a string using a two's complement circuit according to the prior art.
Figure 3:
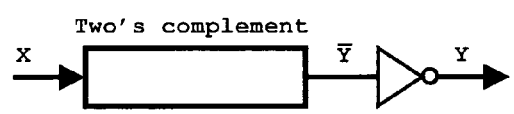
FIG. 3 depicts a decrement circuit of a string using a two's complement circuit according to the prior art.
Figure 4:
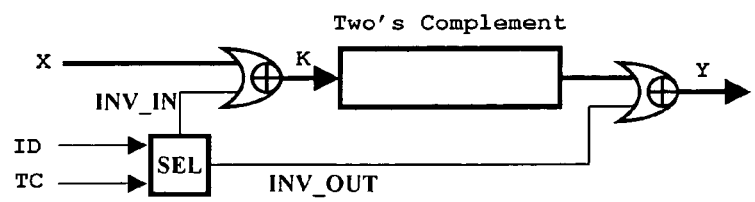
FIG. 4 depicts a multifunction DIT circuit without overflow check according to the prior art.

The truth table of signals ID, TC, INV_IN and INV_OUT is TABLE 1 and the logic selection circuit SEL of FIGS. from 12a to 12c is the same of FIG. 4.

Figure 13:
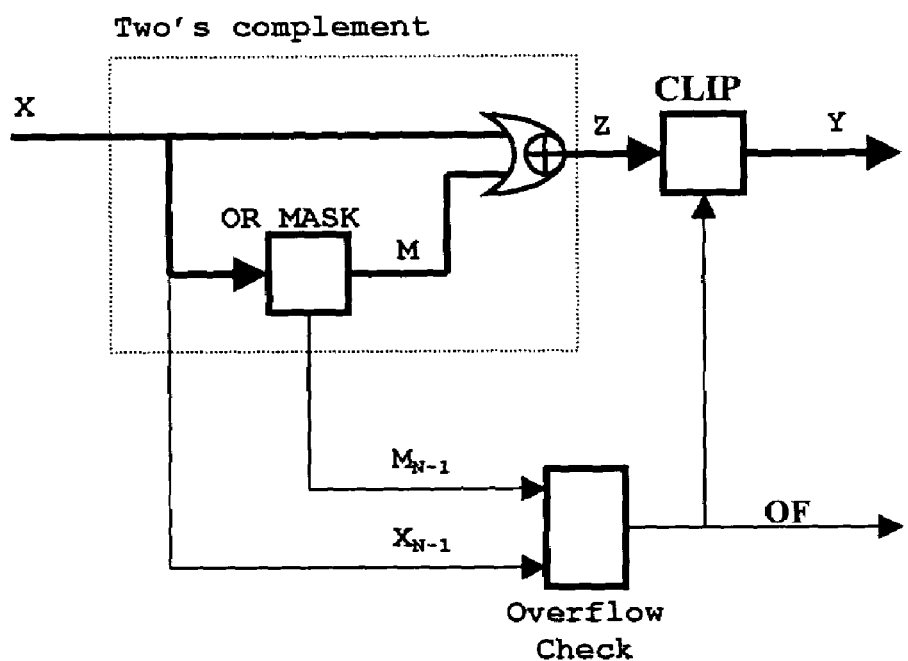

The method of the invention allows the generation of the overflow flag simply as a logic combination only of the most significant bits $M_{N-1}$ and $X_{N-1}$ of the auxiliary string M and of the string to be complemented X, respectively, independently from the number N of bits of the string to be complemented. A two's complement circuit of the invention with overflow check is depicted in FIG. 13. The circuit OVERFLOW CHECK can generate the overflow flag OF only using the most significant bits $X_{N-1}$ and $M_{N-1}$ because when the string X represents the number $-2^{N-1}$, and only in this case, the bit $X_{N-1}$ is 1 and the bit $M_{N-1}$ is 0.

Figure 5:
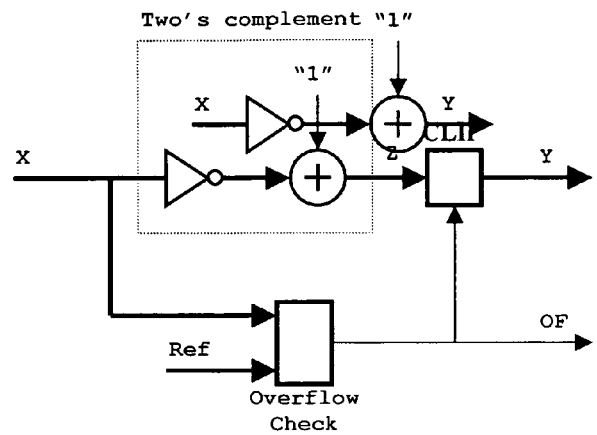
FIG. 5 depicts a two's complement circuit with overflow check according to the prior art.

A great advantage of the present invention with respect to the known two's complement circuit of FIG. 5 includes the fact that the overflow flag OF is generated independently from the number N of bits of the string X, and the circuit OVERFLOW CHECK occupies a silicon area smaller than the area of an N bit comparator.

Figure 14:
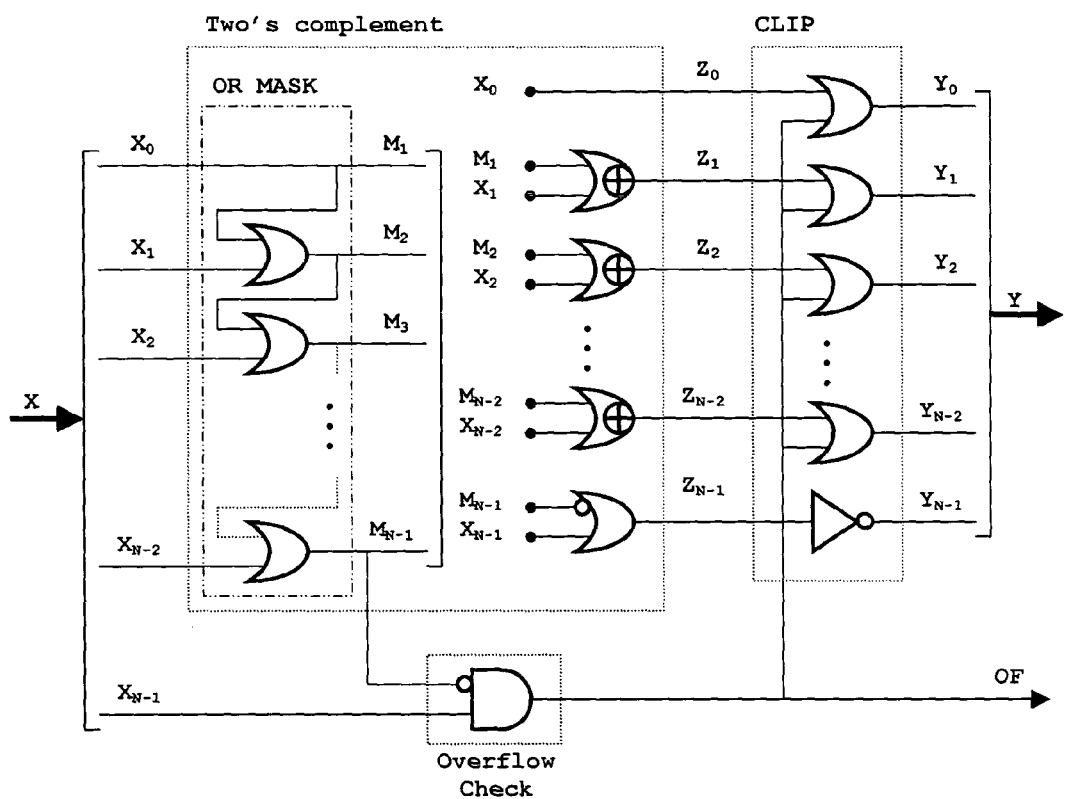
FIG. 14 is a detailed view of the circuit of FIG. 13.

A detailed scheme of an embodiment of a two's complement circuit of the invention that performs the correction of eq. 6 is depicted in FIG. 14. The XOR gate input with the bits $X_0$ and $M_0$ has been omitted because the least significant bit of the auxiliary string $M_0$ is always 0, and thus this gate is unnecessary.

Moreover the gate of the two's complement circuit input with the most significant bits $M_{N-1}$ and $X_{N-1}$ and generating the bit $Z_{N-1}$ is an OR gate and not a XOR gate, in order to correct the output when the string X to be complemented represents the number $-2^{N-1}$. In fact, independently from the state of the flag OF, the most significant bit $Y_{N-1}$ of the output string may be generated by negating the bit $Z_{N-1}$, as it is evident from the following table:

TABLE 2

| X | $M_{N-1}$ | $X_{N-1}$ | $Y_{N-1}$ | $Z_{N-1}$ |
|---|---|---|---|---|
| 0...0 | 0 | 0 | 0 | 1 |
| $-2^{N-1}$ | 0 | 1 | 0 | 1 |
| any other | 1 | — | $\overline{X_{N-1}}$ | $X_{N-1}$ |

Figure 15:
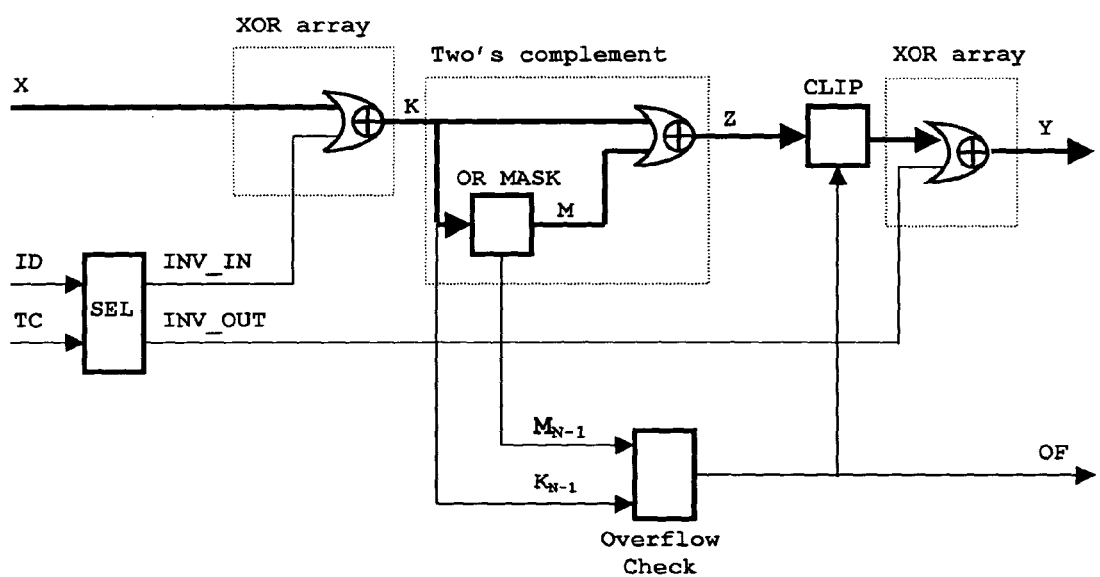

The two's complement circuit with overflow test of FIG. 13 may be used for realizing a multifunction DIT circuit of the invention for decrementing, incrementing and two's complementing, as depicted in FIG. 15, whose circuit blocks are the same as that of FIGS. 4 and 13. It is easy to demonstrate that the features that describe the functioning of the DIT circuit of FIG. 15 are that depicted in FIG. 16.

Figure 17:
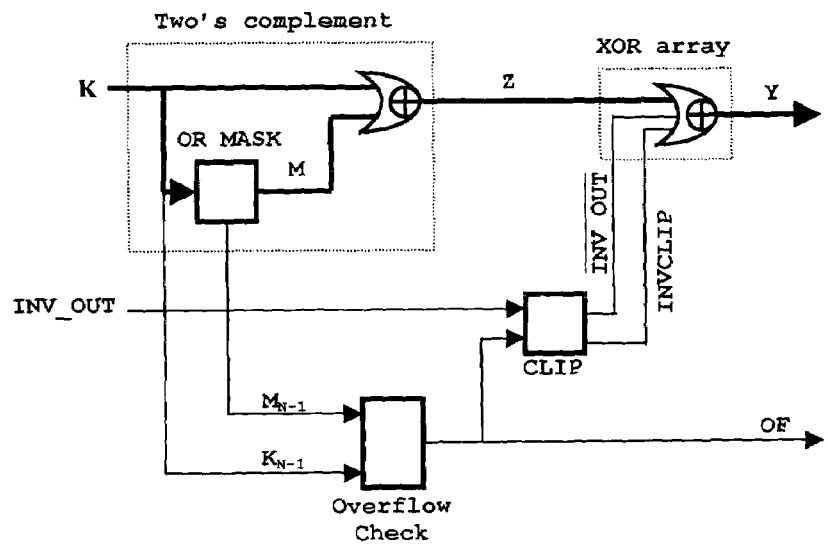
FIG. 17 depicts a circuit for decrementing or two's complementing with overflow check that uses the two's complement circuit of FIG. 6a, and has a correction circuit CLIP upstream the output array of XOR logic gates.

FIG. 17 depicts a general diagram of a preferred embodiment of a two's complement or decrement circuit of the invention. As it is possible to note, differently from the multifunction DIT circuit of FIG. 15, the correction circuit CLIP is upstream the array of output XOR gates and is not input with a bit string but only with two signals, INV_OUT and OF, whichever the number N of bits of the string K is.

The correction circuit CLIP generates a correction signal INVCLIP and a negated replica of the signal INV_OUT for making the array of output XOR gates perform the correction of eq. 6 of the complemented string Z. Therefore, the array of output XOR gates of the two's complement or decrement circuit of the invention is useful also when no decrement operation has been requested. This expedient allows a simplification of the structure of the correction circuit CLIP with a further saving of silicon area.

Figure 18:
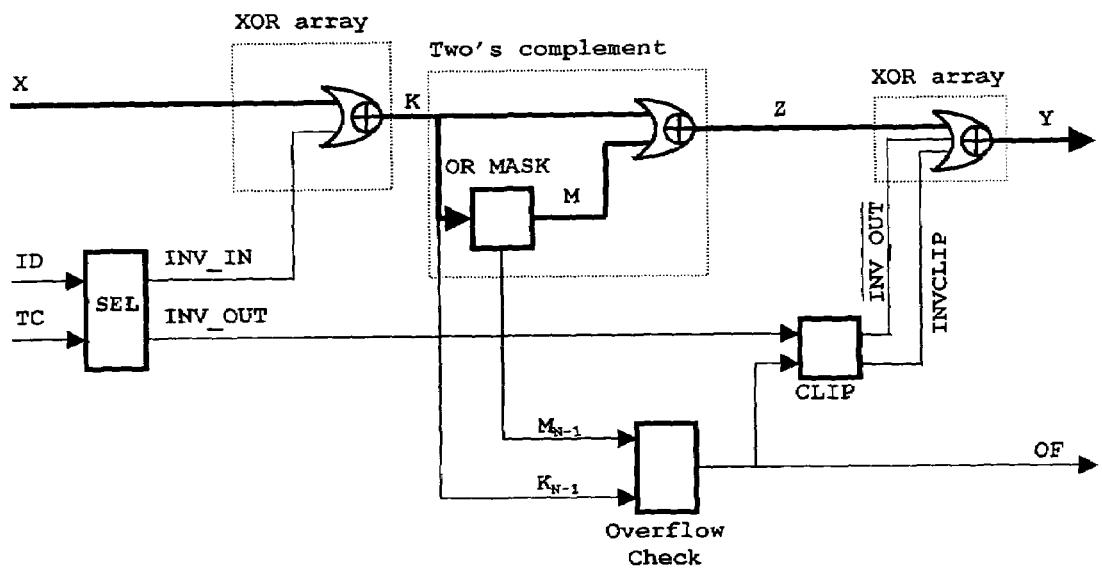
FIG. 18 illustrates another multifunction DIT circuit of the invention with overflow check that uses the circuit of FIG. 17.

The two's complement or decrement circuit of the invention may be embodied in a multifunction DIT circuit for incrementing, decrementing or two's complementing a string as shown in FIG. 18. The truth table of signals INV_IN and INV_OUT is TABLE 1, already written referring to the multifunction DIT circuit of FIG. 4.

Figure 19:
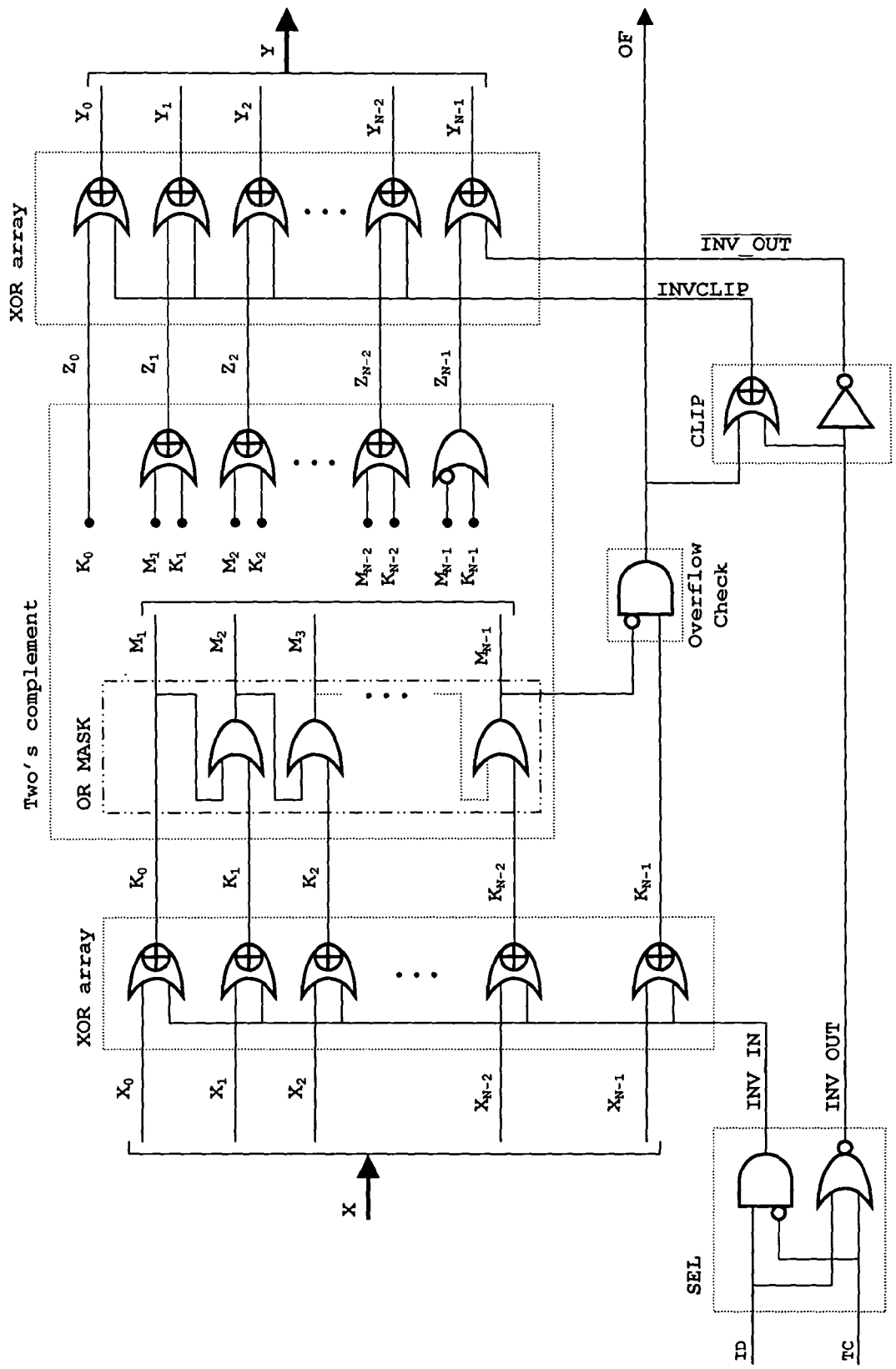
FIG. 19 depicts in detail an embodiment of the multifunction DIT circuit of FIG. 18.

A detailed scheme of an embodiment of the multifunction DIT circuit of FIG. 18 is depicted in FIG. 19. In this embodiment, which is even more convenient than that of FIG. 15, the overflow flag OF is generated by ANDing the most significant bit of the string to be two's complemented $K_{N-1}$ and a negated replica of the most significant bit of the auxiliary string $M_{N-1}$, and the correction signal INVCLIP is the logic XOR between the overflow flag OF and the signal INV_OUT.

The circuit of FIG. 19 performs the same functions of that of FIG. 15. Should an overflow occur (OF=1), it would mean that the string K to be complemented represents the number $-2^{N-1}$, and thus the most significant bit $Z_{N-1}$ of the complemented string is 1 while all other bits are 0. In the case in which any decrement operation has been required (INV_OUT=0), the correction signal INVCLIP is 1 and thus the N−1 least significant bits of the output string Y are 1 while the most significant bit $Y_{N-1}$ is 0. In the case in which a decrement operation has been required (INV_OUT=1), the correction signal INVCLIP is 0 and the output string Y is equal to the complemented string Z.

Figure 16:
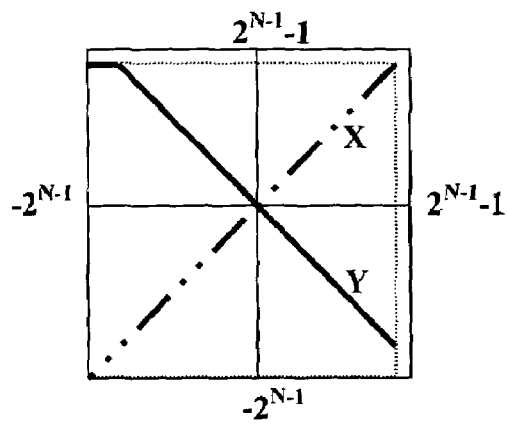
FIG. 16 shows the functioning characteristics of a DIT circuit of the invention.
Figure 16:
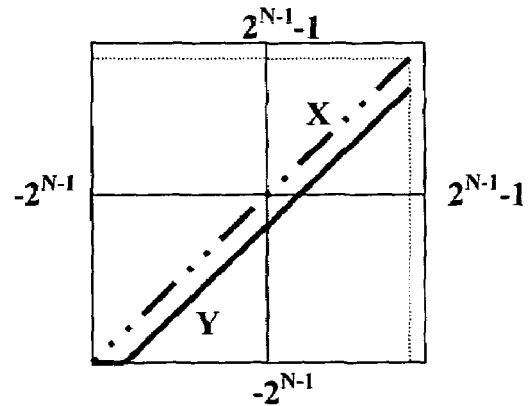
Figure 16:
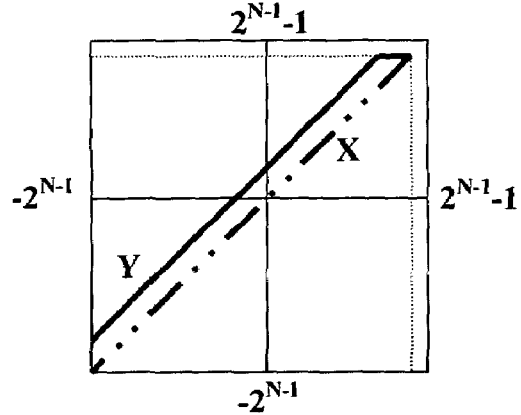
Figure 20:
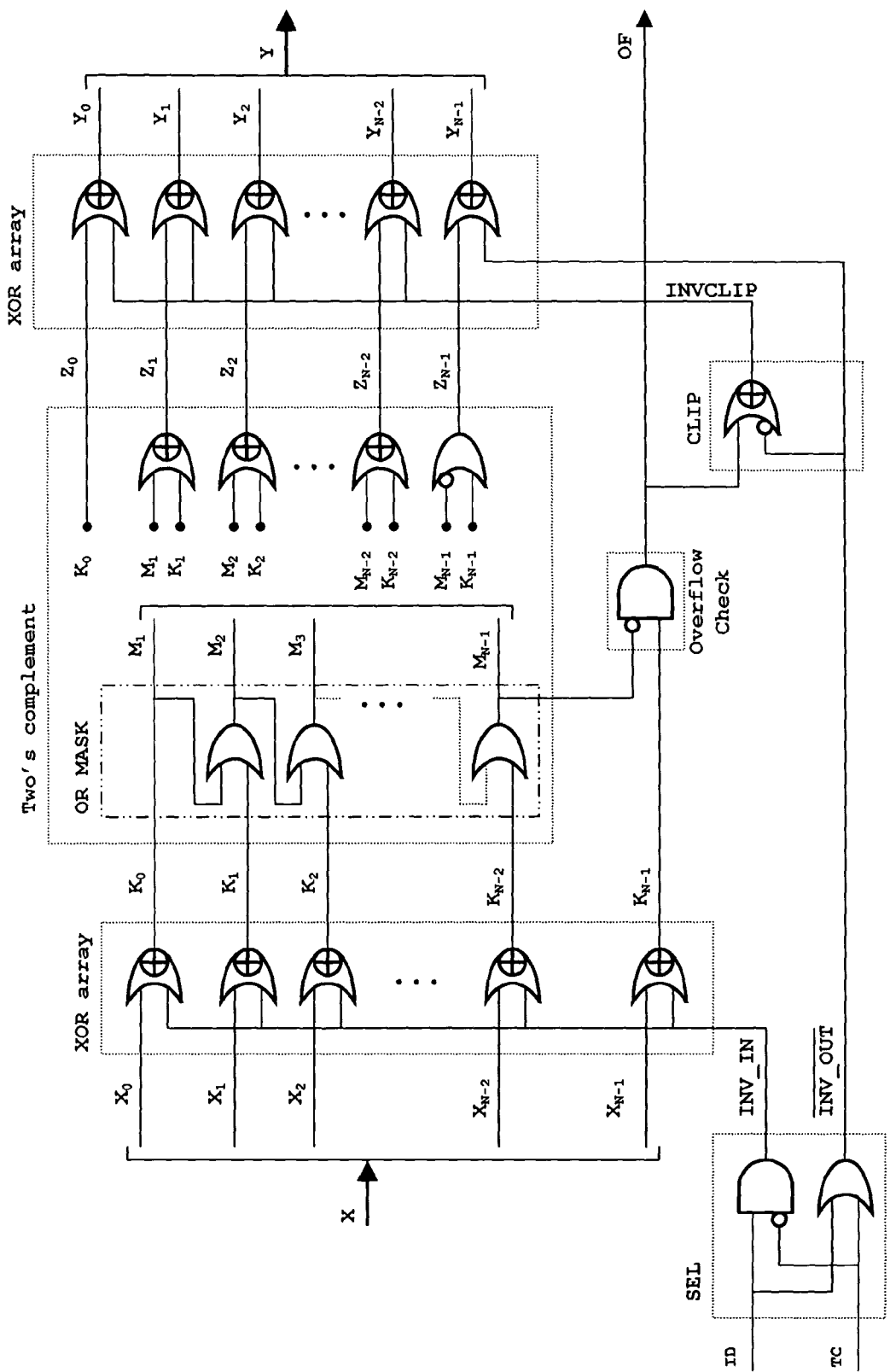
FIG. 20 depicts in detail another embodiment of the multifunction DIT circuit of FIG. 18.

It is possible to verify immediately that, in all other possible cases, the operating characteristics of the DIT circuit of FIG. 19 are that depicted in FIG. 16. An embodiment of the invention, alternative to that of FIG. 19, is depicted in FIG. 20.

The comprehension of its functioning is immediate and will not be described in detail.

That which is claimed is:

1. A method for incrementing, decrementing or two's complementing a first string of N bits, the method comprising:
generating a signal representing an auxiliary string of N bits as a function of the first string, the auxiliary string having a first least significant bit that is independent from the first string and any other bit of the auxiliary string, the generating based on
starting from a second least significant bit up to a most significant bit of the auxiliary string, and performing a first logic combination with a corresponding bit of the first string or a negated replica thereof,
starting from a least significant bit up to a second most significant bit of the first string, and performing the first logic combination with a corresponding bit of the first string or the negated replica thereof less significant than the corresponding bit, and
selection of the first string or the negated replica thereof for the first logic combination is based on the incrementing, decrementing or two's
complementing operation to be performed;
generating an output signal containing a string as a second logic combination of the auxiliary string and of the first string the second logic combination and the selection of the first string or the negated replica thereof with the first logic combination determines whether the incrementing, decrementing or two's complementing operation is being performed on the first string.

2. A method according to claim 1, wherein the least significant bit of the auxiliary string is always null and any other bit, starting from the second least significant bit up to the most significant bit, is a logic OR of a corresponding bit of the first string or of a negated replica thereof and of the bits less significant than the corresponding bit.

3. A method according to claim 2, wherein two's complementing the first string comprises obtaining the other bits of the auxiliary string by ORing an immediately less significant bit of the auxiliary string and a corresponding bit of the first string; and wherein generating the output string comprises performing an XOR of the first string to be complemented and the auxiliary string.

4. A method according to claim 2, wherein decrementing the first string comprises obtaining the other bits of the auxiliary string by ORing an immediately less significant bit of the auxiliary string and a corresponding bit of the first string; and wherein generating the output string comprises performing a negated XOR of the first string and of the auxiliary string.

5. A method according to claim 2, wherein incrementing the first string comprises obtaining the other bits of the auxiliary string by ORing an immediately less significant bit of the auxiliary string and the negated replica of a corresponding bit of the first string; and wherein generating the output string comprises performing an XOR of the auxiliary string and a negated replica of the first string.

6. A method according to claim 1, wherein the least significant bit of the auxiliary string is always 1 and any other bit, starting from the second least significant bit up to the most significant bit, is a logic AND of a corresponding bit of the first string or of a negated replica thereof and of the bits less significant than the corresponding bit.

7. A method according to claim 6, wherein two's complementing the first string comprises obtaining the other bits of the auxiliary string by ANDing an immediately less significant bit of the auxiliary string and a corresponding bit of the first string; and wherein generating the output string comprises performing a negated XOR of the first string to be complemented and of the auxiliary string.

8. A method according to claim 6, wherein decrementing the first string comprises obtaining the other bits of the auxiliary string by ANDing an immediately less significant bit of the auxiliary string and a corresponding bit of the first string; and wherein generating the output string comprises performing an XOR of the first string and of the auxiliary string.

9. A method according to claim 6, wherein incrementing the first string comprises obtaining the other bits of the auxiliary string by ANDing an immediately less significant bit of the auxiliary string and a corresponding bit of the first string; and wherein generating the output string comprises performing a negated XOR of the first string and of the auxiliary string.

10. A method according to claim 1, further comprising generating an overflow flag as a logic combination among the most significant bits of the auxiliary string and of the first string.

11. A method according to claim 10, wherein the overflow flag is generated by ANDing the most significant bit of the first string and a negated replica of the most significant bit of the auxiliary string when two's complementing or decrementing the first string.

12. A method according to claim 11, wherein two's complementing the first string with correction of the output string in case of overflow comprises obtaining the other bits of the auxiliary string by ORing an immediately less significant bit of the auxiliary string and a corresponding bit of the string;
the most significant bit of the output string being obtained by NORing the most significant bit of the first string and the negated replica of the most significant bit of the auxiliary string, any other bit of the output string being obtained by ORing the overflow flag and the logic XOR between corresponding bits of the first string and of the auxiliary string.

13. A method according to claim 11, wherein for two's complementing the first string with correction of the output string in case of overflow comprises obtaining the other bits of the auxiliary string by ORing an immediately less significant bit of the auxiliary string and a corresponding bit of the string;
the most significant bit of the output string being obtained by NORing the most significant bit of the first string and the negated replica of the most significant bit of the auxiliary string, any other bit of the output string being obtained by XORing the overflow flag and the logic XOR between corresponding bits of the first string and of the auxiliary string.

14. A method according to claim 11, wherein decrementing the first string with correction of the output string in case of overflow comprises obtaining the other bits of the auxiliary string by ORing the immediately less significant bit of the auxiliary string and a corresponding bit of the string;
the most significant bit of the output string being obtained by ORing the most significant bit of the first string and the negated replica of the most significant bit of the auxiliary string, and any other bit of the output string being obtained by XORing the negated replica of the overflow flag and the logic XOR between corresponding bits of the first string and of the auxiliary string.

15. A method according to claim 10, wherein the overflow flag is generated by ANDing the negated replicas of the most significant bits of the first string and of the auxiliary string when incrementing the first string.

16. A method according to claim 15, wherein incrementing the first string with correction of the output string in case of overflow comprises obtaining the other bits of the auxiliary string by ORing an immediately less significant bit of the auxiliary string and the negated replica of a corresponding bit of the string;

the most significant bit of the output string being obtained by ORing the most significant bit of the first string and the negated replica of the most significant bit of the auxiliary string, and any other bit of the output string being obtained by ORing the overflow flag and the logic XOR between corresponding bits of the first string and of the auxiliary string.

17. A circuit for incrementing, decrementing or two's complementing a first string of N bits, the circuit comprising:

an auxiliary circuit for generating a signal representing auxiliary string of N bits as a function of the first string, the auxiliary string having a first least significant bit that is independent from th& first string and any other bit of the auxiliary string, the generating based on starting from a second least significant bit up to a most significant bit of the auxiliary string, and performing a first logic combination with a corresponding bit of the first string or a negated replica thereof, starting from a least significant bit up to a second most significant bit of the first string, and performing the first logic combination with a corresponding bit of the first string or the negated replica thereof less significant than the corresponding bit and selection of the first string or the negated replica thereof for the first logic combination is based on the incrementing, decrementing or two's complementing operation to be performed; and logic circuit means for generating an output signal containing a string as a second logic combination of the auxiliary string and of the first string, the second logic combination and the selection of the first string or the negated replica thereof with the first logic combination determines whether the incrementing, decrementing or two's complementing operation is being performed on the first string.

18. A circuit according to claim 17, wherein said auxiliary circuit generates the auxiliary string with the first least significant bit always null, with the second least significant bit being a replica of the least significant bit of the first string or as the negated replica thereof, said auxiliary circuit comprising:

N–2 OR gates for generating a respective bit of the auxiliary string, starting from a third least significant bit up to the most significant bit by ORing a corresponding bit of the first string or the negated replica thereof, starting from the least significant bit up to the second most significant bit of the first string, and the bits of the first string or of the negated replica thereof less significant than the corresponding bit.

19. A circuit according to claim 17, wherein said auxiliary circuit generates the auxiliary string with the first least significant bit always null, with the second least significant bit being a replica of the least significant bit of the first string or as the negated replica thereof, said auxiliary circuit comprising:

N–2 OR gates for generating a respective bit of the auxiliary string, starting from a third least significant bit up to the most significant bit, the N–2 OR gates being disposed in a cascade of pairs of logic gates, the OR gates of a first pair of logic gates generating the third least significant bit and a fourth least significant bit of the auxiliary string by ORing the second and third least significant bits, respectively, of the first string or of the negated replica thereof, each pair of OR gates being input with a respective pair of consecutive bits of the first string or of the negated replica thereof and the most significant bit of the auxiliary string generated by the pair of gates that precede in the cascade, and generating two consecutive bits of the auxiliary string by ORing the most significant bit generated by the pair of gates that precede in the cascade and respectively a first bit or the respective pair of consecutive bits and both the first bit and a second bit of the respective pair of consecutive bits of the respective pair of bits.

20. A circuit according to claim 17, wherein said auxiliary circuit generates the auxiliary string with the first least significant bit always null, with the second least significant bit being a replica of the least significant bit of the first string or as the negated replica thereof, said auxiliary circuit comprising:

a cascade of N–2 OR gates being input with a respective bit of the first string or of the negated replica thereof in order starting from the second least significant bit up to the second most significant bit of the first string, each OR gate generating a respective bit of the auxiliary string, starting from the third least significant bit up to the most significant bit of the auxiliary string, as a logic OR of the respective bit of the first string or of the negated replica thereof and of the bit of the auxiliary string generated by the OR gate that precedes in the cascade.

21. A circuit according to claim 20, wherein for two's complementing the first string, each of the bits of the auxiliary string starting from the third least significant bit are obtained by ORing an immediately less significant bit of the auxiliary string and a corresponding bit of the first string; and wherein said logic circuit means comprise:

an array of XOR gates generating bits of the output string by XORing respective bits of the first string to be complemented and of the auxiliary string.

22. A circuit according to claim 20, wherein for decrementing the first string, each of the bits of the auxiliary string starting from the third least significant bit are obtained by ORing an immediately less significant bit of the auxiliary string and a corresponding bit of the first string, and wherein said logic circuit means comprise:

an array of XOR gates, generating bits of a two's complement string by XORing respective bits of the first string to be complemented and of the auxiliary string; and an array of INVERTER gates each being input with a bit of the two's complement string and generating a corresponding bit of the output string.

23. A circuit according to claim 20, wherein for incrementing the first string, each of the bits of the auxiliary string starting from the third least significant bit are obtained by ORing an immediately less significant bit of the auxiliary string of N bits and the negated replica of a corresponding bit of the first string, and wherein said logic circuit means comprise:

an array of XOR gates for generating bits of the output string by XORing respective bits of the first string to be complemented and the auxiliary string.

24. A circuit according to claim 20, wherein for incrementing or decrementing an input string, the circuit further comprising:

an array of N XOR gates each being input with a respective bit of the input string and with a command signal for generating a corresponding bit of the first string, the command signal corresponding to an operation to be performed;

each of the bits of the auxiliary string starting from the third least significant bit being generated by ORing an immediately less significant bit of the auxiliary string and a corresponding bit of the first string; and said logic circuit means comprising an array of logic gates for generating bits of the output string by XORing a negated replica of the selection command and the logic XOR combination of respective bits of the input string and of the auxiliary string.

25. A circuit according to claim 20, further comprising:

a logic selection circuit receiving as input command signals for identifying an operation to be performed and for generating first and second selection signals whose logic state depends on the operation to be performed;

an array of N input XOR gates each being input with a respective bit of the input string and with the second selection signal for generating the first string;

each of the bits of the auxiliary string starting from the third least significant bit being obtained by ORing the immediately less significant bit of the auxiliary string and a corresponding bit of the first string; and said logic circuit means comprising an array of logic gates for generating bits of the output string by XORing the first selection signal and the logic XOR combination of respective bits of the input string and of the auxiliary string.

26. A circuit according to claim 17, wherein said auxiliary circuit generates the auxiliary string with the first least significant bit always equal to 1, with the second least significant bit being a replica of the least significant bit of the first string or as the negated replica thereof, said auxiliary circuit comprising:

a cascade of N−2 and gates being input with a respective bit of the first string of N bits or of the negated replica thereof in order starting from the second least significant bit up to the second most significant bit of the first string, each gate generating a respective bit of the auxiliary string, starting from the third least significant bit up to the most significant bit, by ANDing the respective bit of the first string or of the negated replica thereof and the bit of the auxiliary string generated by the AND gate that precedes in the cascade.

27. A circuit according to claim 17, further comprising an overflow check circuit for generating an overflow flag as a logic combination among the most significant bits of the auxiliary string and of the first string.

28. A circuit according to claim 27, wherein for two's complementing or decrementing the first string, said overflow check circuit comprises a logic AND gate for generating the overflow flag, and receives as input the most significant bit of the first string and a negated replica of the most significant bit of the auxiliary string.

29. A circuit according to claim 27, wherein for incrementing the first string, said overflow check circuit comprises a logic AND gate for generating the overflow flag, and receives as input the negated replicas of the most significant bits of the first string and of the auxiliary string.

30. A circuit according to claim 28, wherein for two's complementing with correction of the output string in case of overflow, each of the bits of the auxiliary string starting from the third least significant bit being obtained by ORing an immediately less significant bit of the auxiliary string and a corresponding bit of the first string; and wherein said logic circuit means comprise:

an OR gate being input with the most significant bit of the first string and the negated replica of the most significant bit of the auxiliary string for generating the most significant bit of a two's complement string to be corrected;

an array of XOR gates for generating other bits of the two's complement string to be corrected by XORing corresponding bits of the first string and of the auxiliary string; and a correction circuit comprising an INVERTER gate for generating the most significant bit of the output string as a negated replica of the most significant bit of the two's complement string to be corrected, and an array of N−1 OR gates for generating respective other bits of the output string, each gate receiving as inputs the overflow flag and an output of a respective gate XOR of said array of XOR gates.

31. A circuit according to claim 28, wherein for two's complementing or decrementing with correction of the output string in case of overflow, the circuit further comprising:

an input terminal receiving a selection signal of the operation to be performed;

each of the bits of the auxiliary string starting from the third least significant bit being obtained by ORing an immediately less significant bit of the auxiliary string and a corresponding bit of the first string; and wherein said logic circuit means comprise:

an OR gate being input with the most significant bit of the first string and the negated replica of the most significant bit of the auxiliary string for generating the most significant bit of a two's complement string to be corrected;

an array of XOR gates for generating the other bits of the two's complement string to be corrected by XORing corresponding bits of the first string and of the auxiliary string; and an output logic circuit being input with the two's complement string, the overflow flag and the selection signal for generating an output bit string equal to the two's complement string, or else the output string is obtained by negating all the bits thereof depending on the logic state of the selection signal and of the overflow flag.

32. A circuit according to claim 31, wherein for two's complementing or decrementing with correction of the output string in case of overflow, said output logic circuit comprising:

a logic correction circuit for generating a negated replica of the selection signal and a correction signal by XORing the selection signal and the overflow flag; and an array of N logic XOR gates, one of said XOR gates in being input with the most significant bit of the two's complement bit string and with the negated replica for generating the most significant bit of the output string, and each other XOR gate being input with a respective other bit of the two's complement string and the correction signal for generating corresponding other bits of the output string.

33. A multifunction circuit for decrementing, incrementing or two's complementing an input string of N bits, the multifunction circuit comprising:

a logic selection circuit receiving as input command signals for identifying an operation to be performed and for generating first and second selection signals whose logic state depends on the operation to be performed;

an array of N XOR input gates each being input with a respective bit of the input string and with the first logic signal, for generating a first string of N bits;

an auxiliary circuit for generating an auxiliary string of N bits as a function of the first string, the auxiliary string having a first least significant bit that is independent from the first string and any other bit of the auxiliary string, and starting from a second least significant bit up to a most significant bit of the auxiliary string, said auxiliary circuit performing a logic combination with a corresponding bit of the first string or a negated replica thereof, starting from a least significant bit up to a second most significant bit of the first string, and of the bits of the first string or the negated replica thereof less significant than the corresponding bit; and logic circuit means for generating an output signal containing a string as a logic combination of the auxiliary string and of the first string, said logic circuit means comprising an OR gate being input with the most significant bit of the first string and the negated replica of the most significant bit of the auxiliary string for generating the most significant bit of a two's complement string to be corrected, an array of XOR gates for generating the other bits of the two's complement string to be corrected by XORing corresponding bits of the first string and of the auxiliary string, and an output logic circuit being input with the two's complement string, an overflow flag and a first selection signal corresponding to an operation to be performed for generating the output bit string equal to the two's complement string.

34. A circuit according to claim 33, further comprising an overflow check circuit for generating the overflow flag as a logic combination among the most significant bits of the auxiliary string and of the first string.

35. A circuit according to claim 34, wherein said overflow check circuit comprises a logic and gate for generating the overflow flag, and receives as input the most significant bit of the first string and a negated replica of the most significant bit of the auxiliary string.

36. A multifunction circuit according to claim 33, wherein said logic selection circuit receives as input first and second command signals for generating the first selection signal by NORing the first and second command signals, and a second selection signal by ANDing the first command signal and a negated replica of the second command signal.

* * * * *

UNITED STATES PATENT AND TRADEMARK OFFICE
CERTIFICATE OF CORRECTION

PATENT NO. : 7,395,305 B2
APPLICATION NO. : 10/651075
DATED : July 1, 2008
INVENTOR(S) : Daniele Lo Iacono It is certified that error appears in the above-identified patent and that said Letters Patent is hereby corrected as shown below:

Column 9, Line 19        Delete: "th&"
                         Insert: --the--

Column 11, Line 15       Delete: "performed"
                         Insert: --performed,--

Column 11, Line 36       Delete: "and"
                         Insert: --AND--

Column 12, Line 53       Delete: "in"
                         Insert: --m--

Signed and Sealed this

Twenty-eighth Day of October, 2008

JON W. DUDAS
*Director of the United States Patent and Trademark Office*